May 9, 1950           W. A. BRACKEN           2,507,397
AUTOMOBILE WINDSHIELD SUN VISOR
Filed Dec. 15, 1947           3 Sheets-Sheet 1
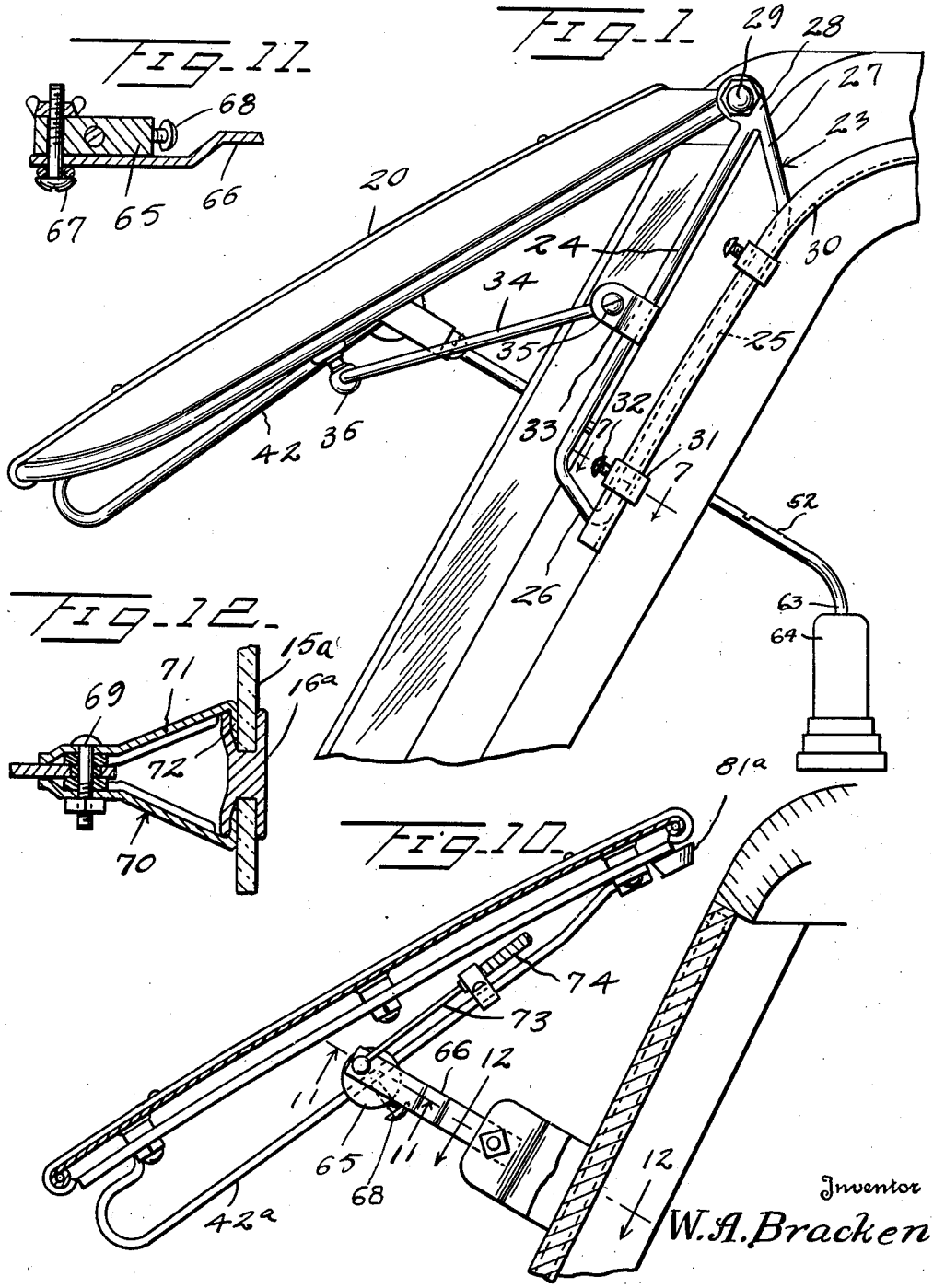
Inventor
W.A.Bracken
By
Kimmel & Crowell attys.

May 9, 1950   W. A. BRACKEN   2,507,397
AUTOMOBILE WINDSHIELD SUN VISOR
Filed Dec. 15, 1947   3 Sheets-Sheet 2
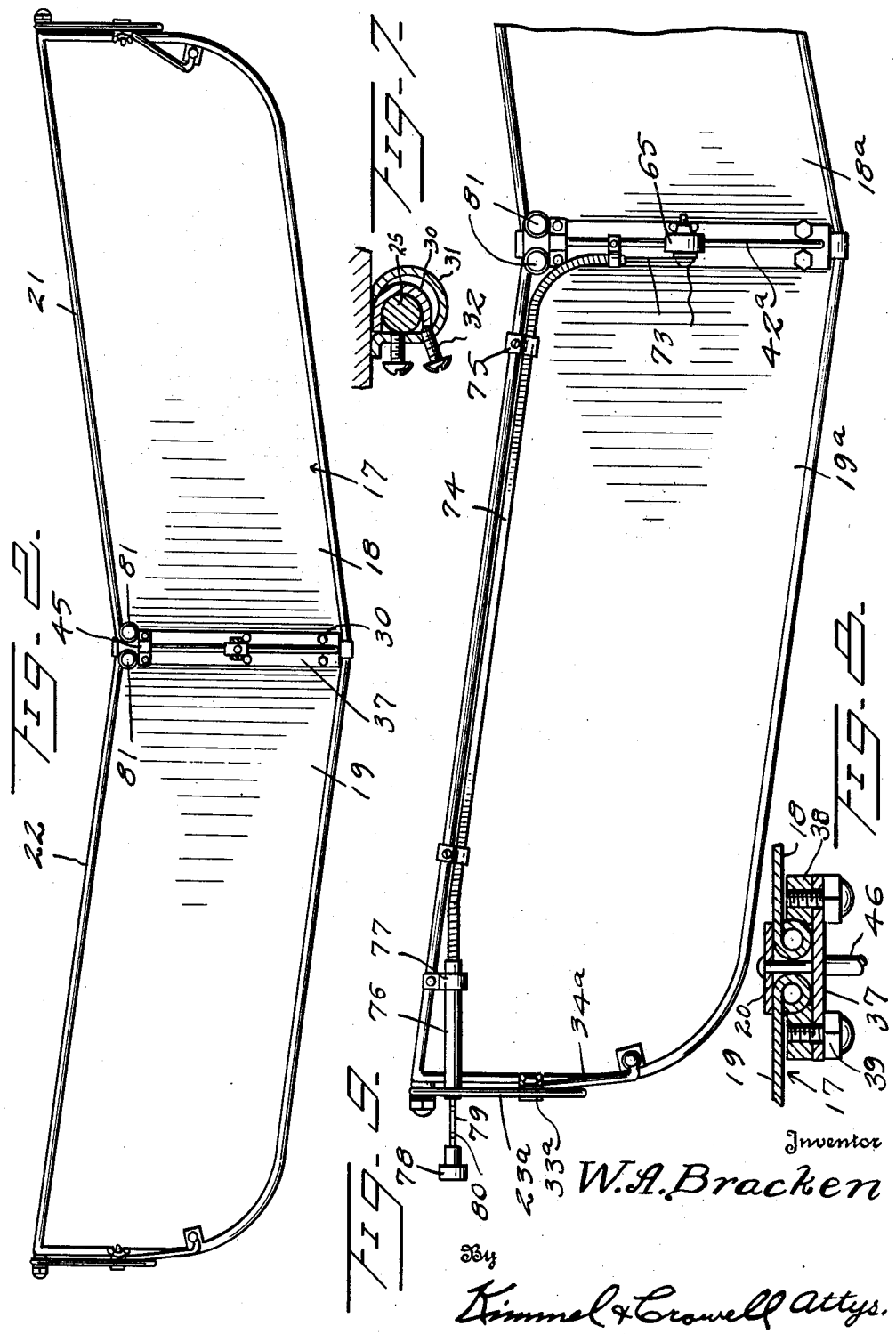
Inventor
W. A. Bracken
By
Kimmel & Crowell Attys.

May 9, 1950 W. A. BRACKEN 2,507,397
AUTOMOBILE WINDSHIELD SUN VISOR
Filed Dec. 15, 1947 3 Sheets-Sheet 3
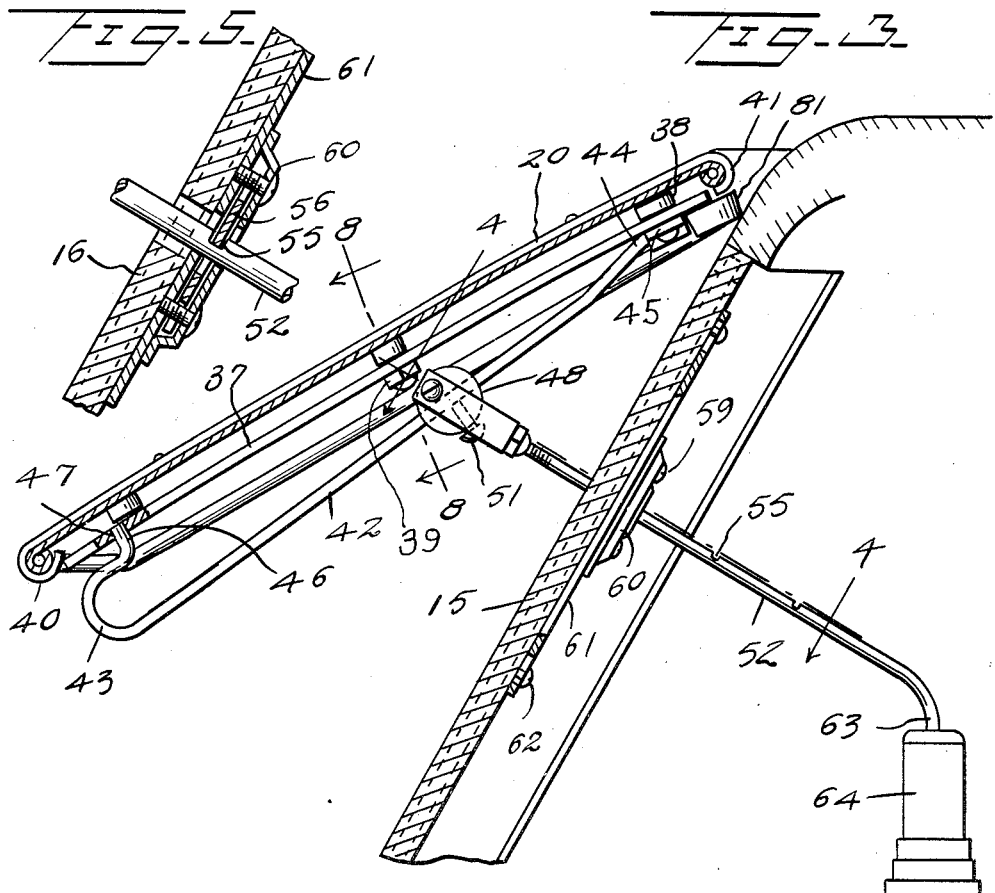
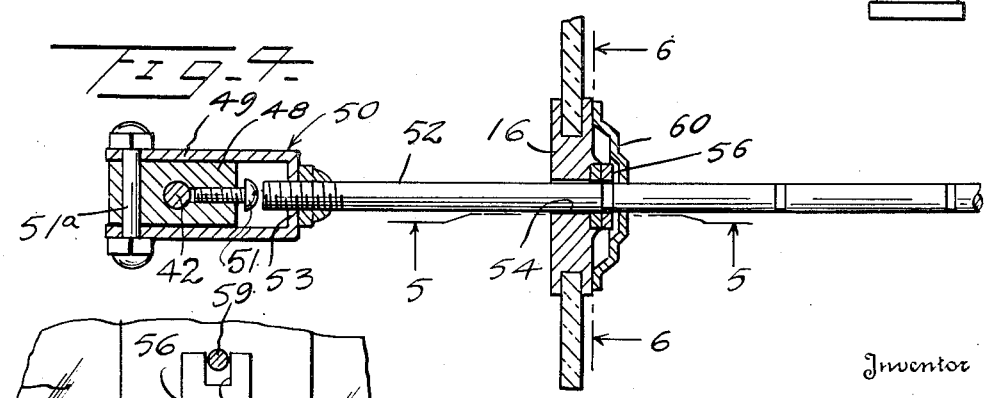
Inventor
W. A. Bracken
By
Kimmel & Crowell Attys.

Patented May 9, 1950

2,507,397

UNITED STATES PATENT OFFICE 2,507,397

AUTOMOBILE WINDSHIELD SUN VISOR

William A. Bracken, Levy, Ark.

Application December 15, 1947, Serial No. 791,884

4 Claims. (Cl. 296—95)

This invention relates to visors for vehicles.

An object of this invention is to provide an improved visor for vehicles for mounting on the outer side of the windshield, and means extending into the vehicle body for angularly adjusting the visor.

Another object of this invention is to provide a visor for a vehicle for mounting on the outer side of the windshield, and an improved adjusting means for angularly adjusting the visor with respect to the windshield. In a preferred form of this invention the adjusting means extends through the center frame bar for the windshield, whereas in a modified form of this invention the adjusting means comprises a Bowden wire which may be extended laterally or to one side of the vehicle, or if desired may be extended through the windshield frame for mounting on the instrument board.

With the above and other objects in view, my invention consists in the arrangement, combination and details of construction disclosed in the drawings and specification, and then more particularly pointed out in the appended claims.

In the drawings,

Figure 1 is a detail end elevation of a visor constructed according to an embodiment of this invention, showing the visor in applied position on the windshield or front end of a vehicle, Figure 2 is a bottom plan view of the visor removed from the vehicle, Figure 3 is a vertical section through substantially the central portion of the visor, Figure 4 is a fragmentary sectional view taken on the line 4—4 of Figure 3, Figure 5 is a fragmentary sectional view taken on the line 5—5 of Figure 4, Figure 6 is a fragmentary sectional view taken on the line 6—6 of Figure 4, Figure 7 is a fragmentary sectional view taken on the line 7—7 of Figure 1, Figure 8 is a fragmentary sectional view taken on the line 8—8 of Figure 3, Figure 9 is a fragmentary bottom plan view of a modified form of this invention, Figure 10 is a vertical sectional view of the structure shown in Figure 9, taken through substantially the center thereof and showing the visor in applied position, Figure 11 is a fragmentary sectional view taken on the line 11—11 of Figure 10, Figure 12 is a fragmentary sectional view taken on the line 12—12 of Figure 10.

Referring to the drawings and first to Figures 1 to 8 inclusive, the numeral 15 designates generally the windshield of a vehicle, which includes a center bar 16. A visor generally designated as 17 is adapted to be mounted in angularly disposed position with respect to the windshield 15, and the visor 17 includes oppositely extending plates 18 and 19 which are connected together at their inner ends by a connecting strip 20.

The marginal and lengthwise edges of the plate 18 are rolled as indicated at 21, and the marginal lengthwise edges of the plate 19 are rolled as indicated at 22. The opposite ends of the plates 18 and 19 are adapted to be adjustably secured relative to the body of the vehicle by means of brackets or attaching members 23. There are two of these members 23 secured one to each plate 18 and 19 at the outer ends thereof.

The bracket 23 is formed of parallel bars 24 and 25 which are connected together at their lower ends by a connecting bar 26 and are connected together at their upper ends by a connecting bar 27. A lug or ear 28 extends from the upper end of the bracket 23, and a bolt 29 extends through the ear 28 and is secured to the adjacent end of the plate 18.

The bar 24 constitutes a guide bar, whereas the bar 25 as shown in Figure 7, is adapted to engage in the rain trough 30 which is carried by the vehicle. The bar 25 is clamped within the trough 30 by means of a pair of C clamps 31 which are secured in applied position by means of a pair of bolts or securing members 32, as shown in Figure 7.

The guide bar 24 is offset forwardly from the trough 30 and has slidably mounted thereon a sliding member 33. The rear end of a link 34 is pivotally secured as at 35 to the slide member 33, and is pivotally secured as at 36 to the plate 18 adjacent the outer end of this plate and at a point between the front and rear edges thereof. An elongated strap or bar 37 is secured between the inner ends of the plates 18 and 19 and cooperates with the bar 20 in firmly securing the inner ends of the plate members 18 and 19 together.

The plate or strap member 37 is preferably spaced from the under sides of the plates 18 and 19 by spacers 38 through which the securing members 39 for the two straps 20 and 37 engage. As shown in Figure 3, the opposite ends of the outer strap 20 are bent as at 40 and 41, about the rolled edges of the plates 18 and 19.

The guide bar 42 is disposed beneath the bar 37, being formed with a reverted hook-shaped forward or lower end 43 and an offset inner or upper end 44, the latter being secured by a clamping plate 45 to the lower side of the bar 37. The hook-shaped member 43 includes an upwardly projecting anchoring pin 46 engaging in an opening 47 formed in the bar 37 between the forward or lower pair of securing members 39.

The guide bar 42 has slidably mounted thereon a slide member 48 which engages between the arms 49 of a fork or U-shaped member 50. A screw 51 is threaded into the slide member 48 and may be locked to the guide 42 so as to hold the slide 48 against movement lengthwise of the guide 42. The arms 49 of the U-shaped member or fork 50 are pivotally secured to the slide 48 by means of a pivot bolt 51a.

An elongated visor adjusting rod 52 is secured to the bight 53 of the fork or U-shaped member 50 and extends loosely through the opening 54 which is formed in the connecting member 16 between the two panels of the windshield 15. The bar or rod 52 is formed along the length thereof with notches 55 in a selected one of which a latching plate 56 is adapted to engage. The plate 56 is formed with a keeper 57, as shown in Figure 6, and the ends of the plate or keeper member 56 are formed with oppositely extending slots 58 through which securing members 59 engage.

A cover 60 engages loosely over the keeper member 56 and is secured to a stationary bar 61 which is fastened by fastening members 62 to the inner side of the panel connecting bar 16. The inner end of the visor adjusting rod 52 is bent angularly as indicated at 63 and has mounted thereon a handle or knob 64.

Referring now to Figures 9 to 12 inclusive, there is disclosed a modified form of this invention. A pair of visor plates 18a and 19a are mounted at their opposite ends on the forward end of the vehicle by bracket means 23a, similar to bracket 23, and a link 34a connects the outer ends of the visor plates 18a and 19a to a slide 33a. A guide bar 42a, similar to bar 42 is fixed to the inner ends of the visor forming plates 18a and 19a and has slidable thereon a slide member 65. The slide member 65 has rockably secured thereto a lever 66 which engages a pivot bolt 67 extending through the slide 65. The slide 65 may be fixed relative to the guide 42a by means of a set screw 68.

The lever 66 is rockably secured on a bolt 69 which engages through a pair of clamping arms 70. The arms 70 include rearwardly divergent arms 71 terminating in jaws 72 which are adapted to engage between a panel 15a and the connecting member 16a as shown in Figure 12. The slide 65 is adapted to be adjusted lengthwise of the guide 42a by means of a Bowden wire 73 which engages through a sheath 74 secured by clips 75 to the inner edge of one of the visor plates and as shown in Figure 9, to the inner edge of the visor plate 19a. The outer end of the sheath 74 is mounted in a tubular member 76 secured by means of a clip 77 to the visor plate 19a, and the terminal or extended end of the Bowden wire 73 has mounted thereon a knob 78. The knob 78 is secured to a rod 79 formed with notches 80 which latch in the end of the tubular member or housing 76 so as to lock the Bowden wire in adjusted position. It will be understood that the Bowden wire may, if desired, be extended into the body of the vehicle so that the visor may be adjusted from the inside. As here shown, the visor is adjusted by the operator by extending his arm out through the side window and around the front portion of the vehicle and moving the Bowden wire 73 inward or outward.

In the use and operation of this invention, and referring first to Figures 1 to 8 inclusive, the visor formed of the visor plates 18 and 19 is angularly adjusted with respect to the windshield 15 by turning the rod or shaft 52 substantially 90° so as to disengage the keeper 56 from a notch 55. The rod or bar 52 may then be adjusted endwise and when in adjusted position is again turned 90° so that the handle or knob 64 will be in depending position. As rod 52 is moved outwardly, slide 48 will move downwardly along the guide 42.

In order to eliminate vibration of the visor at least one rubber bumper 81 is secured to the inner rear portion of the center of the visor as shown in Figure 3. A similar bumper 81a (Figure 10) is used with the structure shown in Figures 7 to 12.

The structure shown in Figures 9 to 12 inclusive will operate in substantially the same manner as that shown in Figures 1 to 8 with the exception that when slide 65 is moved lengthwise of the guide 42a, lever 66 will rock in the direction of the movement of slide 65 and the visor members 18a and 19a will be angularly adjusted either up or down with respect to the windshield.

I do not mean to confine myself to the exact details of construction herein disclosed, but claim all variations falling within the purview of the appended claims.

I claim:

1. A sun visor for mounting on the forward side of a windshield of a vehicle, comprising a pair of elongated plates, means securing the inner ends of said plates together, a pair of brackets pivotally secured to the outer ends of said plates, means securing said brackets to the forward end of the vehicle body at the opposite ends of the windshield, an adjusting bar, means mounting said bar for endwise adjustment through said windshield, means pivotally connecting the outer end of said bar to the inner end portions of said plates, said pivot means including an elongated guide bar, a slide engaging said guide bar, a pivotal connection between said slide and said adjusting bar, and correlated latching means carried by said mounting means and said bar for latching the latter in adjusted position.

2. A sun visor for mounting on the forward side of a windshield of a vehicle, comprising a pair of elongated plates, connecting means securing the inner ends of said plates together, a pair of brackets pivotally secured to the outer ends of said plates adjacent the rear portions thereof, each bracket including an elongated guide bar, a slide engaging said guide bar, a link connecting said slide with the adjacent end of a plate, a central guide bar fixed between the inner ends of said plates, a slide engaging said central guide bar, and means for adjusting said latter slide to thereby vary the angular position of said plates relative to said windshield.

3. A sun visor for mounting on the forward side of a windshield of a vehicle, comprising a pair of elongated plates, connecting means securing the inner ends of said plates together, a pair of brackets pivotally secured to the outer ends of said plates adjacent the rear portions thereof, each bracket including an elongated guide bar, a slide engaging said guide bar, a link connecting said slide with the adjacent end of a plate, a central guide bar fixed between the inner ends of said plates, a slide engaging said central guide bar, a link pivotally secured to said latter slide, means pivotally securing said latter link to the central portion of the windshield, and a flexible adjusting member connected to said latter slide and extending laterally of one of said plates.

4. A sun visor for mounting on the forward side of a windshield of a vehicle, comprising a pair of elongated plates, connecting means securing the inner ends of said plates together, a pair of brackets pivotally secured to the outer ends of said plates adjacent the rear portions thereof, each bracket including an elongated guide bar, a slide engaging said guide bar, a link connecting said slide with the adjacent end of a plate, a central guide bar fixed between the inner ends of said plates, a slide engaging said central guide bar, an elongated adjusting bar, means mounting said adjusting bar for endwise adjustment through said windshield, means pivotally securing the forward end of said adjusting bar to said latter slide, and means latching said adjusting bar in endwise adjusted position.

WILLIAM A. BRACKEN.

REFERENCES CITED

The following references are of record in the file of this patent:

UNITED STATES PATENTS

| Number    | Name          | Date          |
|-----------|---------------|---------------|
| 1,604,694 | Hein          | Oct. 26, 1926 |
| 1,627,975 | Kempton et al.| May 10, 1927  |
| 1,807,879 | Simon         | June 2, 1931  |
| 2,334,856 | Atkinson      | Nov. 23, 1943 |